United States Patent
Regunath

(10) Patent No.: US 7,232,287 B2
(45) Date of Patent: Jun. 19, 2007

(54) CONTROLLING A PLURALITY OF DEVICES

(75) Inventor: Shane Regunath, Sheffield (GB)

(73) Assignee: Rolls-Royce PLC, London (GB)

( * ) Notice: Subject to any disclaimer, the term of this patent is extended or adjusted under 35 U.S.C. 154(b) by 57 days.

(21) Appl. No.: 11/182,769

(22) Filed: Jul. 18, 2005

(65) Prior Publication Data

US 2006/0024153 A1    Feb. 2, 2006

(30) Foreign Application Priority Data

Jul. 29, 2004   (GB) ................. 0416888.6

(51) Int. Cl.
*F01D 17/16* (2006.01)
(52) U.S. Cl. ................................. 415/160; 416/35
(58) Field of Classification Search ........... 415/159, 415/160; 416/35
See application file for complete search history.

(56) References Cited

U.S. PATENT DOCUMENTS

| | | | |
|---|---|---|---|
| 3,589,830 A * | 6/1971 | Mogren et al. ............. | 416/1 |
| 3,918,298 A * | 11/1975 | Petersen et al. .......... | 73/664 |
| 4,409,788 A * | 10/1983 | Nash et al. ............ | 60/226.3 |
| 4,447,788 A | 5/1984 | Mundt et al. | |
| 5,228,828 A | 7/1993 | Damlis et al. | |
| 5,779,446 A * | 7/1998 | Althof et al. ............. | 416/36 |

FOREIGN PATENT DOCUMENTS

| | | |
|---|---|---|
| EP | 0 316 814 A2 | 5/1989 |
| EP | 0 567 781 A2 | 11/1993 |
| EP | 0 924 849 A2 | 6/1999 |
| EP | 0 978 772 A2 | 2/2000 |
| EP | 0 902 179 A3 | 7/2000 |
| EP | 1 274 164 A2 | 1/2003 |
| GB | 2 374 123 A | 10/2002 |

* cited by examiner

*Primary Examiner*—Edward K. Look
*Assistant Examiner*—Nathan Wiehe
(74) *Attorney, Agent, or Firm*—Oliff & Berridge, PLC

(57) ABSTRACT

Four actuators are instructed to move to a condition indicated by a demand line 81. Their actual conditions are indicated by four arrows. The method determines if the range 84 of actual conditions exceeds a threshold value, representing an unacceptable mismatch of actuator positions. This comparison is used to establish further demand instructions. For example, if the range is too great, and the average 82 is below the demand line 81, the devices are instructed to move to the upper extreme position at 88. If the average position 82 is above the demand line 81, the devices are instructed to move to the lower end of the range, at 90.

This results in the actuator positions moving together, as they also move toward the demand line 81, reducing risks associated with actuator mismatches.

12 Claims, 6 Drawing Sheets

CONTROLLING A PLURALITY OF DEVICES

The present invention relates to a method and apparatus for controlling a plurality of devices.

Many situations exist in which a plurality of devices, such as actuators, provide between them a control function, such as to control the position of another item, and must therefore be controlled in a manner which results in the other item being controlled as effectively as possible. One example is the control of the angular movement of adjustable nozzle guide vanes within a gas turbine engine. The orientation of the guide vanes is adjusted according to the operating conditions, such as engine speed. The guide vanes may be controlled by the use of a movable ring, called a unison ring, to which each of the vanes is coupled. A set of actuators control the position of the ring which, in turn, coordinates the positions of the guide vanes. Variations and tolerances between actuators may result in slight differences between the response of each actuator to the same control instructions. This may mean that the actuators do not move in synchronisation, which may result in damage to the unison ring or to the variable guide vanes.

The present invention provides a method of controlling a plurality of devices to respond to a demand, in which:
  (a) an initial demand instruction is established for each device, representing the device conditions required to achieve the demanded response;
  (b) the actual condition achieved by each device is detected;
  (c) a value representing the range of actual conditions is derived from the detected actual conditions, for comparison with a threshold value;
  (d) the result of the comparison is used to establish further demand instructions; and steps (b), (c) and (d) are repeated until the demand is fulfilled, whereby the response of the devices to the demand is coordinated until the demand is fulfilled.

The devices are preferably actuators. The devices may be substantially identical. Preferably, at least some of the devices are operable together to move a common component.

The range value may be derived as the difference between the maximum and minimum values representing the actual conditions. Preferably, when the range value is below the threshold value, further demand instructions are set as the initial demand instructions. Preferably, when the range value is above the threshold value, a value representing the average of the actual conditions is derived, and further demand instructions are set in dependence on the average value. Preferably, when the average value exceeds the average value derived from the conditions required to achieve the demanded response, the further demand instructions are set to achieve a reduced average value of the actual conditions. The further demand instructions are preferably set, for at least some of the devices, to achieve the minimum actual condition of those devices.

When the average value is less than the average value derived from the conditions required to achieve the demanded response, the further demand instructions are preferably set to achieve an increased average value of the actual conditions. The further demand instructions may be set, for at least some of the devices, to achieve the maximum actual condition of those devices.

The invention also provides apparatus for controlling a plurality of devices to respond to a demand, comprising:
  (a) means operable to receive a demand and to establish an initial demand instruction for each device, representing the device conditions required to achieve the demanded response, and to pass the initial demand instruction to the respective device;
  (b) detector means operable to detect the actual conditions achieved by each device;
  (c) control means operable to derive a range value representing the range of actual conditions from the detected actual conditions; and to compare the range value with a threshold value; and to establish further demand instructions in dependence on the result of the comparison, and wherein the detector means and the control means are operable to repeatedly detect actual conditions and establish further instructions, as aforesaid, whereby the response of the devices to the demand is coordinated until the demand is fulfilled.

The devices are preferably actuators. The devices may be substantially identical. Preferably, at least some of the devices are operable together to move a common component.

The range value may be derived as the difference between the maximum and minimum values of the actual conditions. Preferably, when the range value is below the threshold value, further demand instructions are set as the initial demand instructions. When the range value is above the threshold value, a value representing the average of the actual conditions is derived, and further demand instructions are set in dependence on the average value. Preferably, when the average value exceeds the average value derived from the conditions required to achieve the demanded response, the further demand instructions are set to achieve a reduced average value of the actual conditions. The further demand instructions are preferably set, for at least some of the devices, to achieve the minimum actual condition of those devices.

When the average value is less than the average value derived from the conditions required to achieve the demanded response, the further demand instructions are preferably set to achieve an increased average value of the actual conditions. The further demand instructions may be set, for at least some of the devices, to achieve the maximum actual condition of those devices.

The invention also provides a gas turbine engine having a plurality of devices which provide, between them, a control function for the engine, the engine further comprising apparatus as aforesaid, for controlling the plurality of devices.

The invention also provides an aircraft having a plurality of devices which provide, between them, a control function for the aircraft, the aircraft further comprising apparatus as aforesaid, for controlling the plurality of devices.

Examples of the present invention will now be described in more detail, by way of example only, and with reference to the accompanying drawings, in which.

Figure 2:
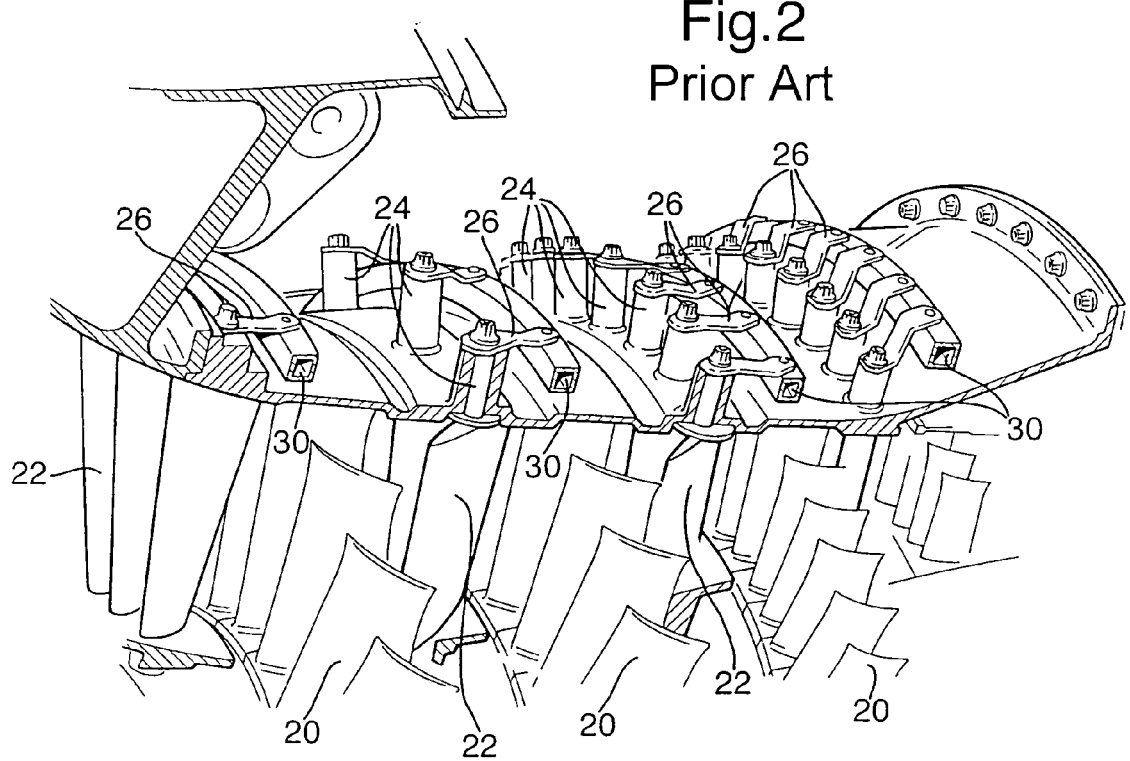
FIG. 2 is a part cut away perspective view of a compressor stage and associated guide vanes of the engine of FIG. 1, illustrating the manner of controlling variable guide vanes.
Figure 3:
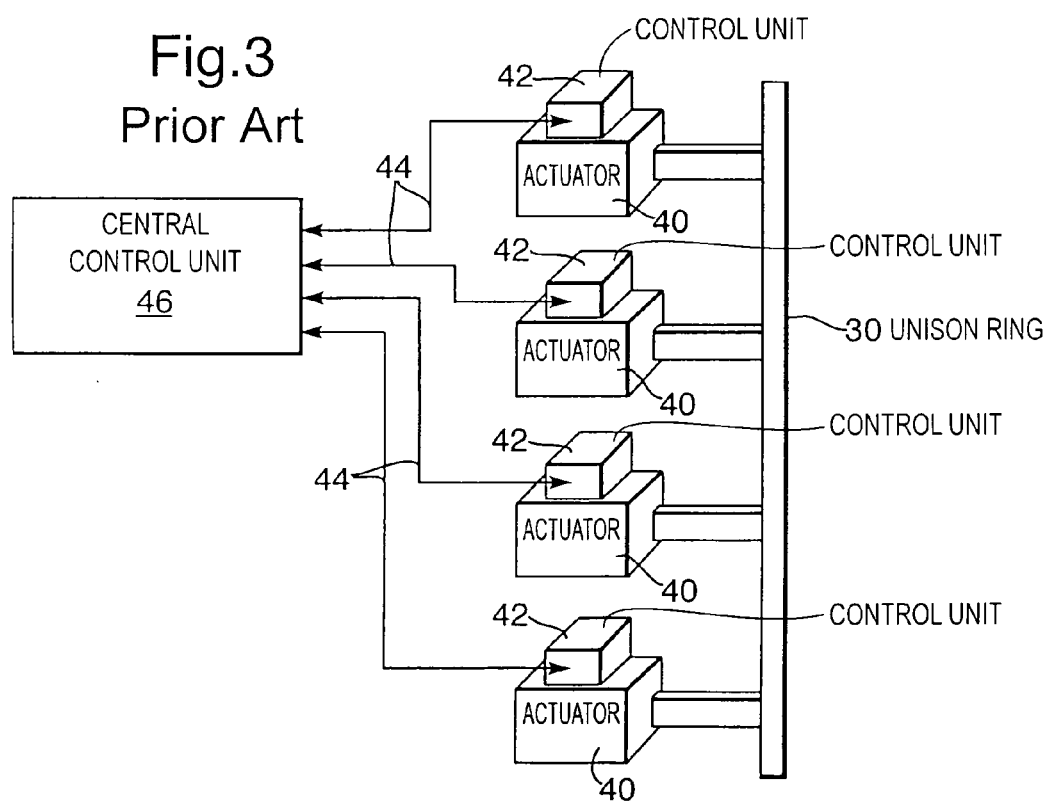
Figure 4:
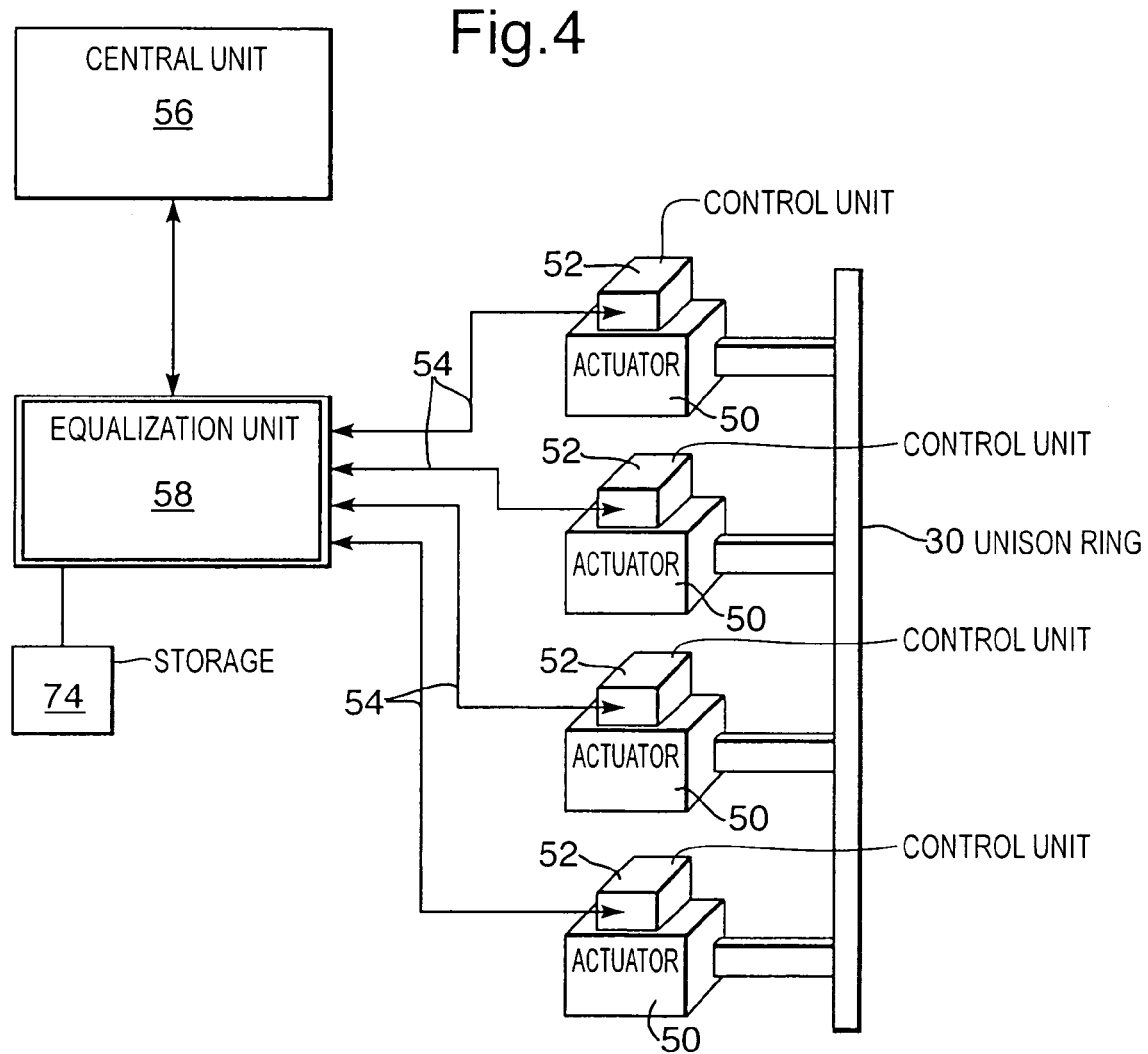
Figure 5:
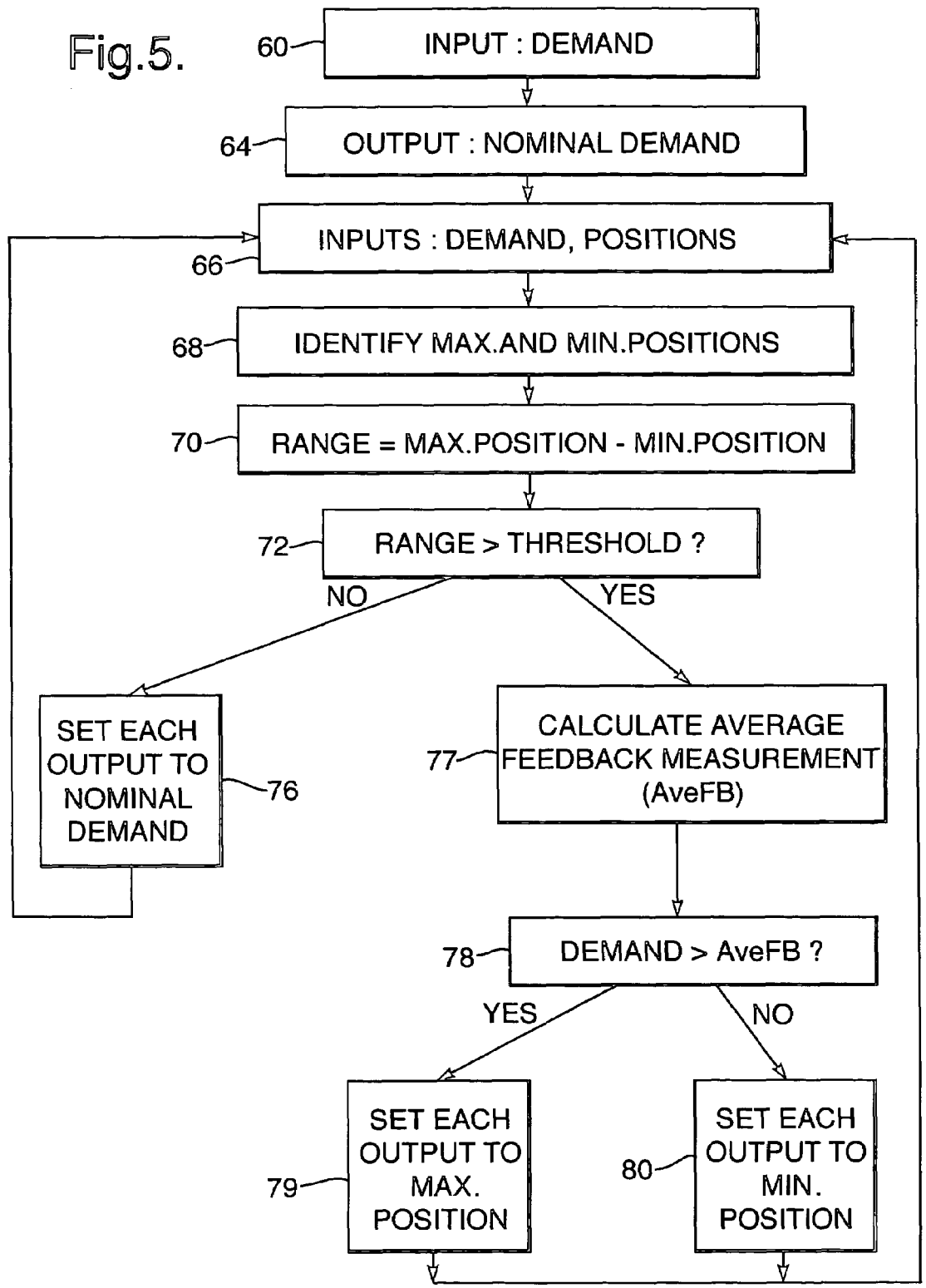
Figure 6:
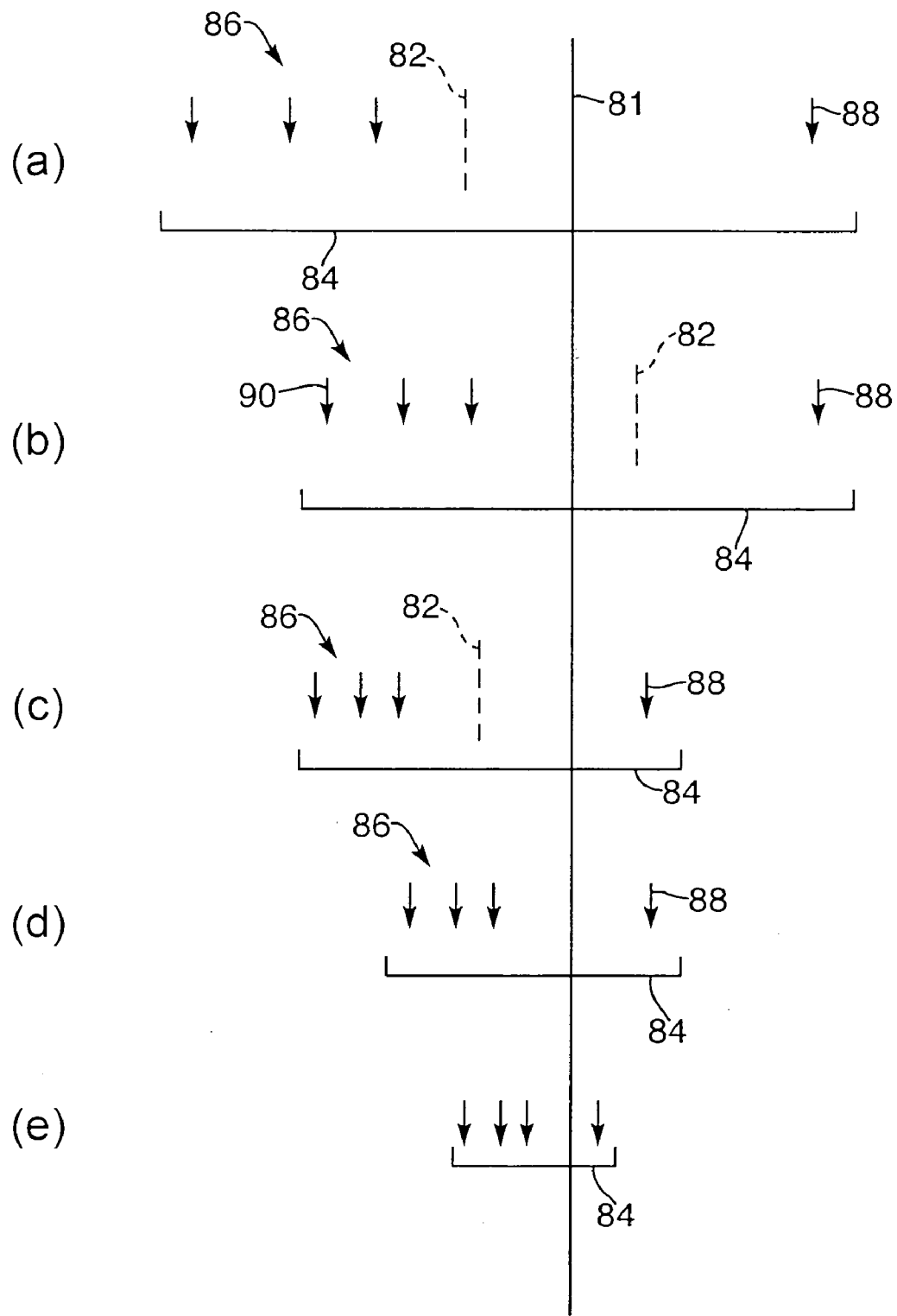
Figure 7:
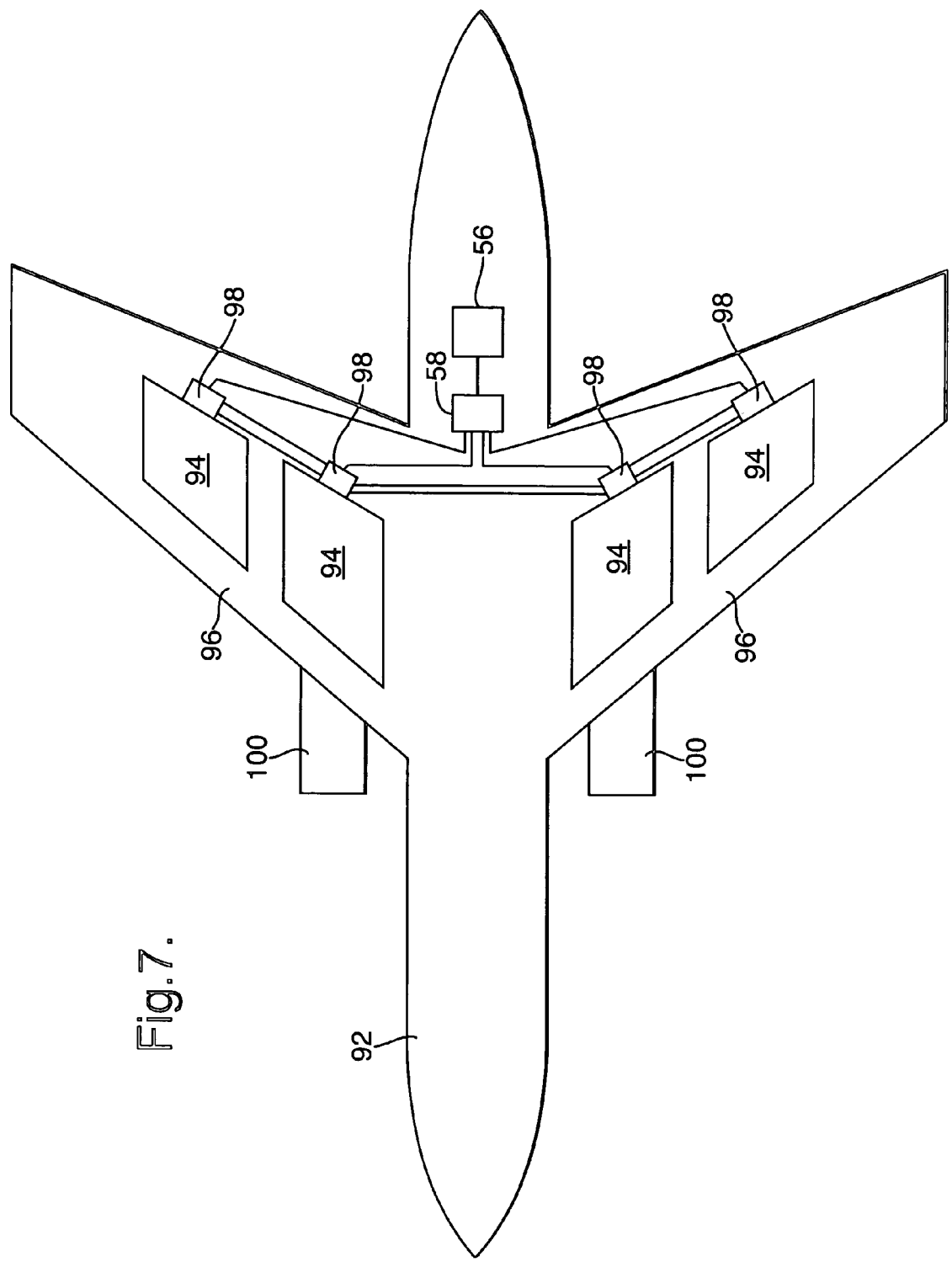

FIG. 3 schematically illustrates a conventional control architecture for the unison ring of FIG. 2;

FIG. 4 illustrates a control architecture in accordance with the present invention;

FIG. 5 is a simplified flow diagram of operation of the arrangement of FIG. 4;

FIG. 6 highly schematically illustrates the effect of the arrangement of FIGS. 4 and 5, during use; and FIG. 7 is a schematic plan of an aircraft in which an embodiment of the invention is implemented.

Examples of the present invention will now be described with particular reference to their application to gas turbine engines. It is therefore appropriate to begin with an explanation of the basic operation of a gas turbine engine and of one example of a control function within the engine, with which the present invention can be implemented.

Figure 1:
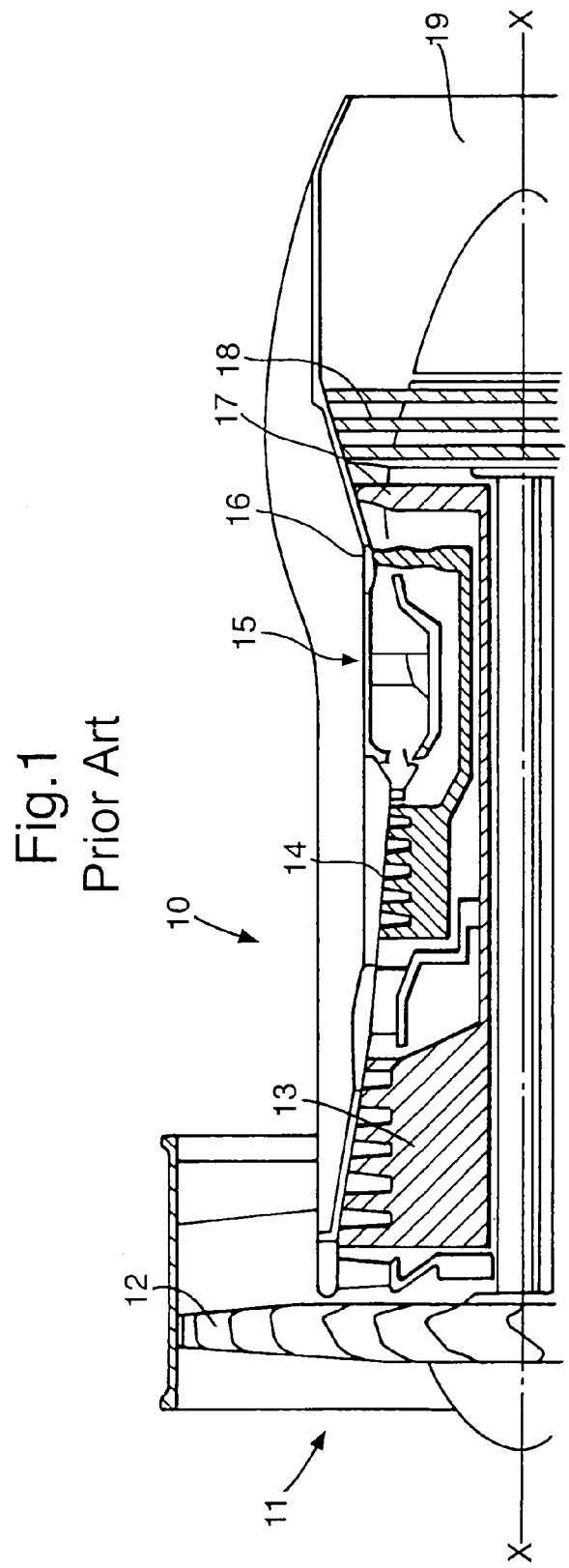
FIG. 1 is an axial section through a gas turbine engine with which the present invention may be implemented.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts.

FIG. 2 illustrates some details of one of the compressor stages, in more detail. Rings of compressor blades 20 alternate with guide vanes 22, which serve to improve the air flow through the compressor, by influencing the angle at which the air flow impinges on the blades 20. The vanes 22 are rotatably mounted at 24 and carry a control arm 26 by which the corresponding vane 22 may be turned about an axis which is generally radial with respect to the main rotation axis of the engine 10. This allows the characteristics of the air flow to be adjusted according to operating conditions, such as engine speed. The position of each ring of vanes 22 is coordinated by attaching the arms 26 to a unison ring 30, which extends around the compressor. Thus, rotating the unison ring 30 about the main rotation axis of the engine 10 allows all of the vanes 22 of the corresponding ring of vanes to be adjusted in unison.

FIG. 3 illustrates a prior proposal for a control architecture for controlling the unison ring of FIG. 2. Four actuators 40 are positioned around the ring 30. Each actuator 40 has an associated control circuit 42 which receives signals at 44 from a central control unit 46. The central control unit 46 acts in a supervisory capacity to provide an instruction to the controls 42, representing the required condition of the actuator 40 to achieve a desired position of the unison ring. Each control unit 42 provides local control of the corresponding actuator 40, responsive to feedback from the actuator 40, to move the actuator 40 to the position required to meet the demand set by the signal 44. In a simple arrangement, each actuator 40 may be nominally identical and installed so that any desired position of the unison ring is achieved by moving each of the actuators 40 to the same position, so that each of the signals 44 may be the same.

The arrangement of FIG. 3 is a form of distributed control architecture, because the control units 42 provide local control, including the receipt of feedback from the respective actuators 40 and can thus ensure that the corresponding actuator 40 is put into the condition demanded by the signal 44, without additional signals being required to pass to or from the central control unit 46. This has advantages in terms of performance, reliability and cost. However, we have realised that a distributed control architecture of this nature may cause a different type of problem to arise.

For example, problems may arise if there are mismatches between nominally identical actuators. Although nominally identical, different actuators may not respond in exactly the same way, in practice. For example, differences in environmental conditions (such as temperature), differences in wear or other ageing properties, or differences resulting from maintenance or adjustment, may all affect the response of individual actuators. Therefore, in practice, we have found that mismatches may occur and may have serious consequences. For example, if mismatches between actuators in the arrangement of FIG. 2 are too great, damage may occur to the unison ring or the variable vanes or the actuators, thus impairing future performance.

FIG. 4 illustrates an architecture in accordance with the present invention. In this example, the unison ring 30 is again controlled by four actuators 50, each having a local control unit 52. Instructions to the control units 52 are received at 54 and are ultimately derived from a central control unit 56, equivalent to the unit 46 of FIG. 3. However, communication between the central unit 56 and the control units 52 is not direct, but is through an equalisation unit 58. The unit 58 is shown in FIG. 4 as a separate component of the system but can be incorporated as an additional function within the central unit 56, for example by the implementation of appropriate hardware and/or software.

The purpose and function of the equalisation unit 58 can best be described by considering the operation of the arrangements of FIG. 4, during use, alongside the flow diagram of operation of the unit 58, shown in FIG. 5.

Initially, when the unison ring is to be moved to change the positions of the variable guide vanes, the central unit 56 issues a demand instruction indicating the required positions of the actuators 50 to achieve the desired position of the unison ring and vanes. Alternatively, the demand may simply indicate the required position of the unison ring 30. The demand is passed to the equalisation unit 58 as an input received as step 60 of FIG. 5.

Initially, the equalisation unit 58 uses the demand received at 60 to send instructions 54 to the control units 52, representing the actuator positions which will nominally result in the unison ring 30 being repositioned to the required position. This is step 64 of FIG. 5. The local control units 52 will begin controlling the actuators 50 to move to the positions instructed by this initial demand instruction.

In addition to controlling the local actuator 50, each control unit 52 senses the current position of the corresponding actuator 50 and reports this to the equalisation unit 58, over the connection at 54. Thus, in addition to the demand instruction received from the central unit 56, the equalisation unit 58 is provided with information about the actual positions reached by each actuator 50. In a real situation, there will be variation between the actual positions of each actuator, even when the actuators 50 are nominally identical, as noted above. Thus, having identified the demand from the unit 58, and each of the positions from the units 52 (step 66 in FIG. 5), the equalisation unit 58 is able to identify the maximum and minimum values from within the positions reported from the units 52. This is step 68 of FIG. 5. Having identified the maximum and minimum positions, the size of the range of positions can be identified (step 70) by subtracting the minimum position from the maximum position. The equalisation unit 58 then compares the range at step 72 with a threshold value for the range, which may be stored locally, for example at 74, or provided by the central unit 58, or calculated from the demand.

The choice of subsequent steps depends on whether the range identified at step 70 exceeds the threshold value, or not.

If the range does not exceed the threshold, any mismatch between the actuators is known to be relatively small, and appropriate setting of the threshold value may ensure that when the threshold value is not exceeded, any such mismatches are acceptable within the system. Accordingly, at step 76, the outputs from the equalisation unit 58 to each control unit 52 are reaffirmed as demand instructions representing the demand from the central unit 56. Control then reverts to step 66 to allow the actual positions to be reported again and the same analysis to be repeated. Thus, while any mismatches remain relatively small, each iteration of the process leaves the demand instructions 54 unaltered, corresponding with the demand from the unit 56.

If step 72 detects that the range of actual positions exceeds the threshold, an alternative sequence begins, commencing with step 77. Thus, step 77 is implemented when the range of actual positions of the actuators 50 is found to be excessive (as defined by the threshold value for the range), indicating a potential risk to the apparatus, arising from excessive mismatch of the actuators. When this situation occurs, step 77 calculates an average from the actual actuator positions, this value being called AveFB. Step 78 then compares AveFB with the actuator position required in response to the demand from the unit 56. Thus, step 78 is determining in which sense the average position (AveFB) varies from the position required to meet the demand.

If the AveFB position is below the demand position, step 79 sets new demand instructions to the units 52, requiring every actuator 50 to move to the position corresponding with the maximum position determined at step 68. Conversely, if AveFB position is greater than the demand position, step 80 sets new demand instructions requiring all of the actuators 50 to move to the position represented by the minimum position identified at step 68. Control then reverts to step 66 for a further iteration of the sequence which has been described.

The significance of the procedure just described can best be described by reference to FIG. 6, which is a highly schematic diagram of several iterations of the process of FIG. 5, for the apparatus of FIG. 4. In each of FIG. 6 steps (a) to (e), the horizontal axis is used to indicate actuator position, with four arrows being used to indicate the current position of each of the four actuators 50. A line 81 indicates the required position for each of the actuators 50, in order to meet the demand from the central unit 56.

Thus, FIG. 6, step (a) illustrates the situation when step 66 is reached for the first time. The demand line 81 has been established and the actuators have been given an initial demand instruction to move to the position represented by the demand line 81. However, none of the actuators have yet reached the demand line 81. In FIG. 6, step (a), three actuators 50 are to one side of the demand line 81. One actuator 50 is to the other side of the demand line 81. The average actuator position, represented by a short broken line 82 is spaced from the demand line 81, in the same direction as the group of three actuators 50. It can be seen by comparison with the other parts of FIG. 6, that the range in FIG. 6, step (a) represented by the bracket 84, is relatively large. It is therefore assumed that at step 72, the range 84 is found to be in excess of the threshold value. Since the average 82 is to the left of the demand line 81 (representing a lower value in this diagrammatic representation), step 79 is thus reached and further demand instructions are established to require the three actuators in the group 86 to move to the position of the isolated actuator at 88.

A short time later, further execution of step 66 will reveal the position illustrated in FIG. 6, step (b). The isolated actuator at 88 has remained at the same position in view of the further demand instructions established at step 79. The group of three actuators at 86 have moved further toward the isolated actuator at 88 and thus toward the demand line 81. In FIG. 6, step (b) it is assumed that this movement has been sufficient to move the average 82 to the other side of the demand line 81. The range 84 still remains excessive. Accordingly, this iteration of the sequence of FIG. 5 results in step 80 setting further demand instructions requiring all actuators to move to the position represented by the lowest actuator at 90. Thus, at a further execution of step 66, these new instructions will have had the effect of grouping the group 86 more tightly together as they seek to reach the position of the lowest actuator 90, and the position of the isolated actuator at 88 will have been pulled across toward the demand line 81, seeking to reach the position of the lowest actuator 90.

A further execution of step 66 reveals the position shown in FIG. 6, step (c) in which the average position 82 has again moved below the demand line 81. The range 84 has significantly reduced in comparison with FIG. 6, step (a), but is still excessive. Thus, step 79 is again reached and further demand instructions are issued to move the group at 86 to the position of the isolated actuator at 88.

A further execution of step 76 reveals that the actuator positions are still closer together and in particular, it is assumed in FIG. 6, step (d) that the range 84 is now within the acceptable limit set by the threshold value. Accordingly, step 76 is executed to set further demand instructions equal to the demand line 81, resulting in each of the four actuators moving individually to the demand line 81. FIG. 6, step (e) shows all four actuators moving toward the demand line 81, from the positions shown in FIG. 6, step (d).

It is thus found that if the range 84 is excessive, those actuators at one end of the range will be instructed to move to the other end of the range, rather than to the demand line 81, thus resulting in the range reducing more rapidly, and reducing the risk of mismatches causing operating problems. However, by alternating the further demand instructions between the extreme positions, as the average crosses the demand line, results in the group steadily moving more tightly to the demand line, even as the range is reduced.

The examples described above, particularly in FIG. 6, have assumed that nominally identical actuators are being used to control a single item, requiring the actuators to each have the same position when the desired position of the item (the unison ring) is achieved. It can readily be understood that the principles can be applied to situations in which the initial demand results in each actuator being instructed to move to a different position, in which case a representation such as FIG. 6 would become much more complex or alternatively, could be interpreted as representing variation from the required value, rather than representing actual position.

Furthermore, the invention can be applied in other situations in which devices are required to respond to a demand in a coordinated manner. One example is illustrated in FIG. 7. An aircraft 92 has fuel tanks 94 in both wings 96. Fuel pumps 98 are able to move fuel between the tanks 94, to maintain the balance of the aircraft. In this example, the control unit 56 and the equalisation unit 58 are used to set fuel levels in the various tanks 94, and to coordinate the response of the pumps 98 to ensure that differences in fuel levels do not result in unacceptable imbalance, prior to the desired levels being achieved.

The aircraft 92 has engines 100 which may have unison rings or other control systems controlled as described above.

Many other situations could be envisaged in which multiple devices, such as actuators, are required to work together in response to a demand, but to maintain some parameters (such as actuator position or fuel level) within a maximum range, to avoid practical difficulties such as mechanical failure or aircraft imbalance.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A method of controlling a plurality of devices to respond to a demand, in which:
   (a) an initial demand instruction is established for each device, representing the device conditions required to achieve the demanded response;
   (b) the actual condition achieved by each device is detected;
   (c) a value representing the range of actual conditions is derived from the detected actual conditions, for comparison with a threshold value, wherein the range value is derived as the difference between the maximum and minimum values representing the actual conditions;
      (i) wherein when the range value is above the threshold value, a value representing the average of the actual conditions is derived, and further demand instructions are set in dependence on the average value;
         (A) wherein when the average value exceeds the average value derived from the conditions required to achieve the demanded response, the further demand instructions are set to achieve a reduced average value of the actual conditions; wherein the further demand instructions are set for at least some of the devices to achieve the minimum actual conditions of those devices; or
         (B) wherein when the average value is less than the average value derived from the conditions required to achieve the demanded response, the further demand instructions are set to achieve an increased value of the actual conditions; wherein the further demand instructions are set, for at least some of the devices, to achieve the maximum actual condition of those devices;
   (d) the result of the comparison is used to establish further demand instructions for independently controlling the devices; and steps (b), (c) and (d) are repeated until the demand is fulfilled, whereby the response of the devices to the demand is coordinated until the demand is fulfilled.

2. A method according to claim 1, wherein the devices are actuators.

3. A method according to claim 1, wherein the devices are substantially identical.

4. A method according to claim 1, wherein at least some of the devices are operable together to move a common component.

5. A method according to claim 1, wherein when the range value is below the threshold value, further demand instructions are set as the initial demand instructions.

6. Apparatus for controlling a plurality of devices to respond to a demand, comprising:
   (a) means operable to receive a demand and to establish an initial demand instruction for each device, representing the device conditions required to achieve the demanded response, and to pass the initial demand instruction to the respective device;
   (b) detector means operable to detect the actual conditions achieved by each device;
   (c) control means operable to derive a range value representing the range of actual conditions from the detected actual conditions; and to compare the range value with a threshold value; and to establish further demand instructions in dependence on the result of the comparison, and wherein the detector means and the control means are operable to repeatedly detect actual conditions and establish further instructions for independently controlling the devices, as aforesaid, whereby the response of the devices to the demand is coordinated until the demand is fulfilled, wherein the range value is derived as the difference between the maximum and minimum values of the actual conditions;
      (i) wherein when the range value is above the threshold value, a value representing the average of the actual conditions is derived, and further demand instructions are set in dependence on the average value;
         (A) wherein when the average value exceeds the average value derived from the conditions required to achieve the demanded response, the further demand instructions are set to achieve a reduced average value of the actual conditions; wherein the further demand instructions are set, for at least some of the devices, to achieve the maximum actual condition of those devices; or
         (B) wherein when the average value is less than the average value derived from the conditions required to achieve the demanded response, the further demand instructions are set to achieve an increased average value of the actual conditions; wherein the further demand instructions are set, for at least some of the devices, to achieve the maximum actual condition of those devices.

7. Apparatus according to claim 6, wherein the devices are actuators.

8. Apparatus according to claim 6, wherein the devices are substantially identical.

9. Apparatus according to claim 6, wherein at least some of the devices are operable together to move a common component.

10. Apparatus according to claim 6, wherein when the range value is below the threshold value, further demand instructions are set as the initial demand instructions.

11. A gas turbine engine having a plurality of devices which provide, between them, a control function for the engine, the engine further comprising apparatus as defined in claim 6, for controlling the plurality of devices.

12. An aircraft having a plurality of devices which provide, between them, a control function for the aircraft, the aircraft further comprising apparatus as defined in claim 6, for controlling the plurality of devices.

* * * * *